United States Patent
Lobsiger (10) Patent No.: US 8,555,824 B2
(45) Date of Patent: Oct. 15, 2013

(54) AIR FLOW ARRANGEMENT FOR TWO DIESEL GENERATOR SETS IN SHIPPING CONTAINER

(75) Inventor: Kent A. Lobsiger, Nashville, IN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 13/232,850

(22) Filed: Sep. 14, 2011

(65) Prior Publication Data
US 2012/0181795 A1 Jul. 19, 2012

Related U.S. Application Data

(63) Continuation of application No. 12/316,577, filed on Dec. 12, 2008, now abandoned.

(60) Provisional application No. 61/007,336, filed on Dec. 12, 2007.

(51) Int. Cl.
*F02B 43/08* (2006.01)

(52) U.S. Cl.
USPC ...... 123/3; 123/41.01; 123/41.63; 123/41.11; 290/1 A; 290/54

(58) Field of Classification Search
USPC ......... 123/1 R, 1 A, 2, 3, 41.01, 41.49, 41.56, 123/41.62, 41.65; 137/343; 290/54, 1 A
See application file for complete search history.

(56) References Cited

U.S. PATENT DOCUMENTS

| 5,928,043 | A |   | 7/1999 | Rinzaki |
| 5,932,940 | A | * | 8/1999 | Epstein et al. ......... 310/40 MM |
| 6,413,131 | B1 |   | 7/2002 | Phillips et al. |
| 6,630,756 | B2 |   | 10/2003 | Kern et al. |
| 7,023,101 | B2 | * | 4/2006 | Wang ............. 290/1 A |
| 7,034,410 | B2 | * | 4/2006 | Kennedy ......... 290/1 A |

(Continued)

FOREIGN PATENT DOCUMENTS

| JP | 2007243357 A2 | 9/1995 |
| WO | WO7900707 | 9/1979 |

OTHER PUBLICATIONS

United Kingdom Intellectual Property Office. Examination Report under Section 18(3). Application No., GB1010027.9. Dec. 20, 2011.

(Continued)

*Primary Examiner* — Noah Kamen
*Assistant Examiner* — Long T Tran
(74) *Attorney, Agent, or Firm* — Krieg DeVault LLP (57) ABSTRACT

A system includes a shipping container having air inlets at each end and an air outlet at a top and approximate center. The system includes two engines positioned one on each side of a center region, with two generators—each positioned between one of the engines and an end of the container. The center region includes a fuel tank and an air director. An air flow path on each side flows air in the air inlet, over the generator, over the engine, through an engine radiator, mixes the air with exhaust from the engine, and flows out the air outlet. The system maximizes an exhaust flow path length back to the air inlet to prevent exhaust gas recirculation. The system further configures the exhaust air to be heated and released at a higher location than the inlet to minimize potential exhaust gas recirculation.

18 Claims, 12 Drawing Sheets

(56) References Cited

U.S. PATENT DOCUMENTS

| | | |
|---|---|---|
| 7,081,682 B2 | 7/2006 | Campion |
| 7,146,962 B2 | 12/2006 | Sugimoto et al. |
| 7,245,033 B2 * | 7/2007 | Wurtele ................ 290/1 A |
| 7,589,429 B2 | 9/2009 | Hunter |
| 7,795,745 B2 | 9/2010 | Mellon et al. |
| 2003/0011196 A1 | 1/2003 | Kern et al. |
| 2003/0029390 A1 | 2/2003 | Campion |
| 2003/0030279 A1 | 2/2003 | Campion |
| 2003/0030281 A1 | 2/2003 | Campion |
| 2005/0005601 A1 * | 1/2005 | Piercey, III ................ 60/506 |
| 2006/0055193 A1 * | 3/2006 | Colborne ................ 296/24.3 |
| 2006/0280993 A1 * | 12/2006 | Keefer et al. ................ 429/34 |
| 2007/0137591 A1 * | 6/2007 | Sugimoto et al. .......... 123/41.7 |
| 2007/0227470 A1 * | 10/2007 | Cole et al. ................ 123/3 |
| 2008/0185048 A1 * | 8/2008 | Mellon et al. ................ 137/343 |
| 2008/0224476 A1 * | 9/2008 | Kim et al. ................ 290/1 A |
| 2009/0066091 A1 | 3/2009 | Hunter |
| 2009/0121492 A1 | 5/2009 | Ito et al. |

OTHER PUBLICATIONS

International Bureau of WIPO. International Preliminary Report on Patentability. PCT Patent Application No. PCT/US2008/013625. Jun. 15, 2010.

Korean Intellectual Property Office. International Search Report. PCT Patent Application No. PCT/US2008/013625. Aug. 6, 2009.

* cited by examiner

Fig. 12 ered which claims the benefit of U.S. provisional
AIR FLOW ARRANGEMENT FOR TWO DIESEL GENERATOR SETS IN SHIPPING CONTAINER

CROSS-REFERENCE TO RELATED APPLICATIONS

The present application is a continuation of U.S. patent application Ser. No. 12/316,577 filed on Dec. 12, 2008 now abandoned which claims the benefit of U.S. provisional patent application No. 61/007,336 filed on Dec. 12, 2007, each of which is hereby incorporated by reference in its entirety.

BACKGROUND

The present invention relates to electric power systems, and more particularly, but not exclusively, relates to the packaging of generator sets (engine and generator) in standardized shipping containers.

Several challenges arise when packaging two or more generator sets within a single shipping container. Standard ISO shipping containers are available in varying lengths including at least 20 ft, 30 ft, 40 ft, 48 ft, and/or 53 ft. When generator sets are packaged within standard containers, the optimum design is complex due to space constraints, recycle of exhaust gas into the intake, maximum regulated noise levels, ease of assembly and service access, and providing maximum fuel storage within limited space. Meeting all of the constraints is more difficult when multiple generator sets are installed in the same shipping container, and when the shipping container is standardized and provides little design flexibility.

Thus, further contributions in this area of technology are desirable.

SUMMARY

One embodiment is a unique system for installing multiple generator sets in a standardized shipping container, while minimizing external noise and exhaust recirculation issues. Other embodiments include unique systems and methods to operate generator sets in standard shipping containers. Further embodiments, forms, objects, features, advantages, aspects, and benefits shall become apparent from the following description and drawings.

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
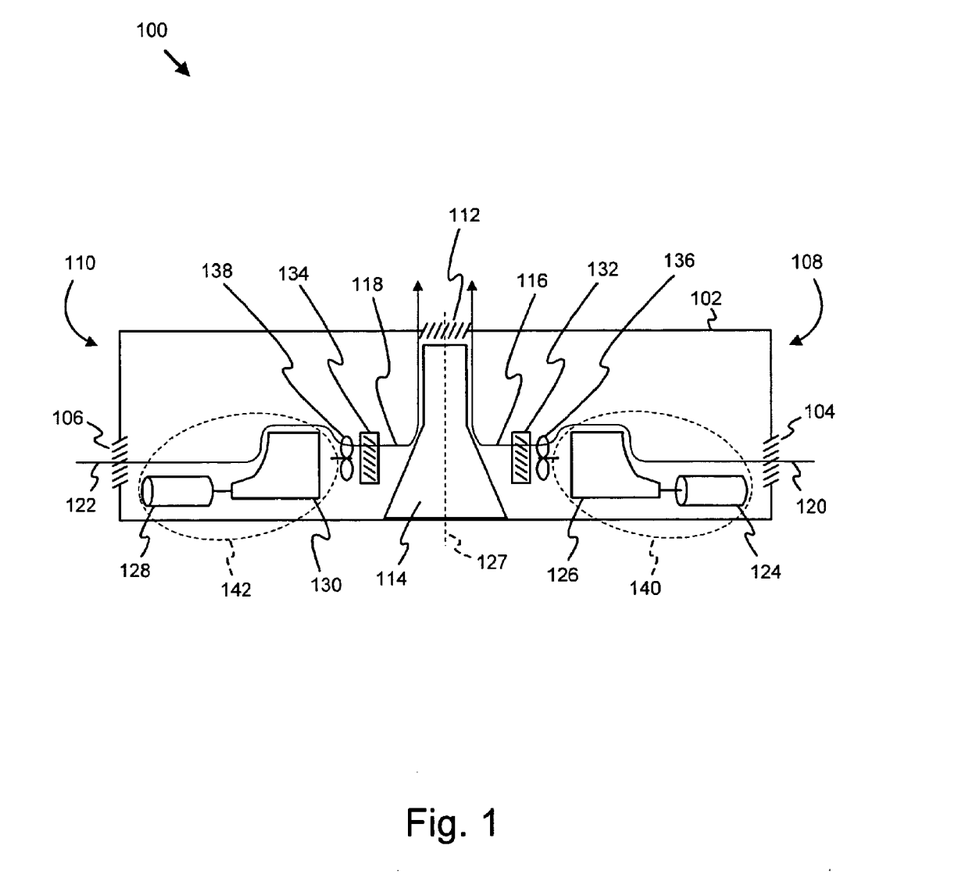
FIG. 1 is a schematic block diagram of a system for installing multiple generator sets.

FIG. 1 is a schematic block diagram of a system 100 for installing multiple generator sets 140, 142 in a standard shipping container 102. In certain embodiments, the shipping container 102 is a standard sized International Organization of Standardization (ISO) shipping container. In certain embodiments, the shipping container 102 has a length of 20 ft, 30 ft, 40 ft, 48 ft, 53 ft, or other length known in the art. The shipping container 102 includes an air inlet 104 at a first end 108 and an air inlet 106 at a second end 110 of the shipping container 102. The air inlets may be screened or louvered, and may be at least partially defined through a side wall of the shipping container (e.g. reference FIG. 3 and related description). In the depicted embodiment, the system 100 includes an air outlet(s) 112 at a top of the shipping container 102. In some embodiments, the air outlet(s) 112 are screened or louvered. In one variation of such embodiments, the air outlet(s) 112 include a coarse debris screen that allows air to exit the shipping container 102 with minimal pressure drop, and the shipping container 102 includes drain holes in a floor of the shipping container 102 (not shown) such that precipitation entering the shipping container 102 through the air outlet(s) 112 will not collect in the shipping container 102, instead passing therethrough.

The system 100 includes a first engine 126 positioned between a longitudinal center 127 of the shipping container 102 and the first end 108, and a second engine 130 positioned between the longitudinal center 127 of the shipping container 102 and the second end 106. System 100 further includes a first generator 124 positioned between the first engine 126 and the first end 108. The first generator 124 is a unit that generates power for external usage, storage, or for other purposes. The first generator 124 generates electric power having an AC or DC output type, and may generate synchronous or asynchronous power. The system 100 further includes a second generator 128 positioned between the second engine 130 and the second end 110. In certain embodiments, the positioning of the generators 124, 128 between the ends 108, 110 and the engines 126, 130 displaces the engines 126, 130 as far as possible from the air inlets 104, 106 reducing the overall noise generated by the system 100 and providing extra heat transfer capability within the shipping container 102 to air inlet streams 120, 122. The first engine 126 coupled with the first generator 124 may be referred to as a first generator set 140, and the second engine 130 coupled with the second generator 128 may be referred to as a second generator set 142.

The system 100 further includes an air director 114 that contributes a vertical component to each of a first exhaust stream 116 and a second exhaust stream 118, and directs the exhaust streams 116, 118 through the air outlet(s) 112. In certain embodiments, the air outlet(s) 112 are positioned at the approximate center of the shipping container 102. Positioning at the approximate center includes a position that intersects the center 127, a position centralized around the center 127 but not including the center 127 (e.g. two air outlets 112 close to the center but spaced on each side of the center), positioning on the shipping container 102 that is close to the center 127 but not right on the center 127 (e.g. if some feature of the shipping container 102 blocks a direct placement of the air outlet(s) 112 on the center), or any other positioning on the shipping container 102 that is viewed as being centralized under the conditions present in the particular embodiment of the system 100. In certain embodiments, placement of the air outlet(s) 112 at the approximate center of the shipping container 102 increases the exhaust flow path length measured from the exit at the air outlet(s) 112 to the entrance at the air inlets 104, 106, which helps reduce flow recirculation of the exhaust streams 116, 118 to the inlet streams 120, 122.

In certain embodiments, the system 100 includes a first air path 120 that includes a portion in thermal communication with the first generator 124, a portion in thermal communication with a first engine radiator 132, and the first exhaust stream 116 flows in the first air path 120. Examples of thermal communication with the first air path 120 include, without limitation, any configuration wherein heat is exchanged between devices 124, 126, 132 and the first air path 120, including flow of the first air path 120 over a device, over the device with heat exchange enhancements (e.g. fins on the first generator 124), and/or flow through a heat exchanger (not shown) structured to put the device and the first air path 120 in thermal communication.

The system 100 includes a second air path 122 that includes a portion in thermal communication with the second generator 128, a portion in thermal communication with a second engine radiator 134, and the second exhaust stream 118 flows in the second air path 122. Examples of thermal communication with the second air path 122 include, without limitation, any configuration wherein heat is exchanged between devices 128, 130, 134 and the second air path 122, including flow of the second air path 122 over a device, over the device with heat exchange enhancements (e.g. fins on the second generator 128), and/or flow through a heat exchanger (not shown) structured to put the device and the second air path 122 in thermal communication.

In certain embodiments, thermal communication between the air paths 120, 122 and the devices 124, 132, 128, 134 and the engines 126, 130 (via the radiators 132, 134) provides cooling to the devices 124, 132, 128, 134 and the engines 126, 130 and provides heat to the exhaust streams 116, 188 to assist in driving exhaust exiting the air outlet(s) 112 vertically and away from recirculation to the inlets 104, 106. The first air path 120 has a portion receiving at least a portion of a first engine exhaust and the second air path 122 has a portion receiving at least a portion of a second engine exhaust. The engine exhausts may be mixed with the air paths 120, 122 inside the shipping container 102, or outside the shipping container 102, for example just above the air outlet(s) 112.

The system 100 further includes a first air movement device 136 that forces air through the first radiator 132 and a second air movement device 138 that forces air through the second radiator 134. The air movement devices 136, 138 can be fans, blowers, or any other air flow generating or air movement device. In certain embodiments, the air movement devices 136, 138 force air through the radiators 132, 134 by pushing air, pulling air, or pressurizing and releasing the air. The air movement devices 136, 138 may direct the air paths 120, 122 at the air director 114 in a manner favorable to generation of vertical flow of the exhaust exiting through the air outlet(s) 112. Pressurizing, as used herein, can mean increasing pressure and/or decreasing pressure depending upon the specific embodiment of the system 100 and the movement device 136, 138 equipment utilized.

Figure 2:
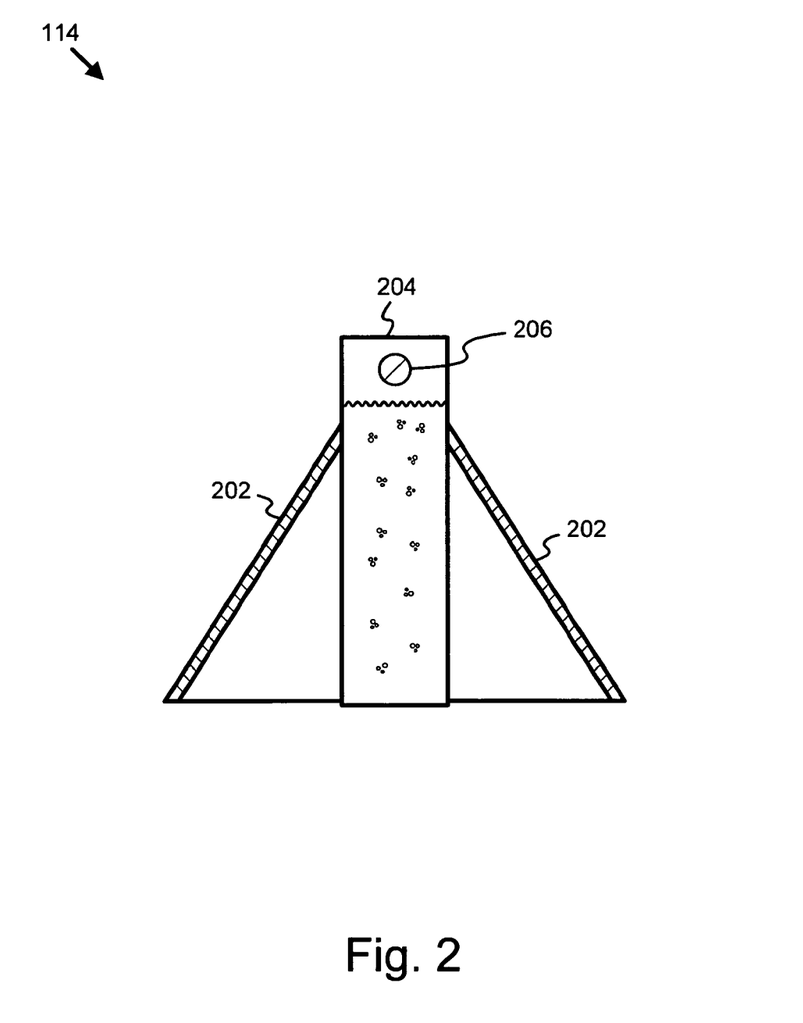
FIG. 2 is a schematic diagram of an air director.

In certain embodiments, the air director 114 is a fuel tank, a portion of a fuel tank, and/or a portion of the air director 114 includes at least a portion of a fuel tank—for an exemplary embodiment of an air director reference FIG. 2 and the related description. In the depicted embodiment, the air director 114 includes a diagonal portion and a vertical portion. In certain embodiments, the air director 114 includes a curved surface (not shown) that favorably directs the exhaust streams 116, 118 into a vertical flow. In other embodiments, director 114 may be different shaped, contoured, or the like; and/or may be remote from the fuel tank.

Each generator set (i.e. the first set 140 and the second set 142) is positioned in a separate, self-contained compartment within the shipping container 102. As depicted, each generator set 140, 142 is positioned with the "front" of the generator set 140, 142 facing to the approximate center 127 of the shipping container, where the front of the generator set 140, 142 is considered the engine-side 126, 130 of the generator set 140, 142. A fuel tank 114 is positioned between the generator sets 140, 142, and the radiators 134, 138 exhaust into the space between the generator sets 140, 142. In certain embodiments, the roof portion of the shipping container 102 is removed above the exhaust area and fuel tank 114.

The air flow paths 120, 122 follow a pattern such that cool air is drawn from the outside area at each opposing end 108, 110 of the shipping container 102 thru the air ducts 104, 106. The generators 124, 128, the engines 126, 130, and radiators 132, 134, transfer heat to air as if flows along the paths 120, 122. The heated air is drawn into and discharged (under pressure) from one or more axial or centrifugal fans 136, 138 before it is directed horizontally at the air director 114 (inconsistent use of 114) and deflected upwards thru the air outlet 112 of the roof. Further, this heated discharge air may be mixed with heated combustion gas from the engines 123, 130. Thus, the discharge air is heated (less dense than surrounding air) and forcibly discharged from the air outlet 112 in the center roof section of the shipping container 102 into the atmosphere above. This flow pattern can be exploited to create a "chimney effect" (low pressure, where cool air enters the air inlets 104, 106 and heated, pressurized air is discharged at the air outlet 112 of the shipping container 102) which promotes effective movement of hot air and combustion gas flow away from the shipping container 102 ref. no. The chimney effect promotes efficient cooling and performance of the generator sets 140, 142 by reducing the risk of hot air and exhaust contaminants from re-entering the shipping container 102.

In the depicted embodiment, two generator sets 140, 142 are included in a shipping container 102 to develop a total needed amount of power, In certain embodiments, the usage of two generator sets 140, 142 allows the use of generator sets 140, 142 with lower rated power settings than a single generator set would require, or provides ready access to additional power when needed. In one implementation, each generator set 140, 142 is rated less than 1200 peak horsepower (hp); however, other ratings may be employed in different embodiments. The usage of lower rated power settings can simplify the design of the system 100 in certain embodiments, for example by allowing the use of standardized parts including radiators, fans, turbochargers, and the like, rather than requiring specially designed parts for generator sets having an unusually high power rating.

While the above referenced embodiment was discussed relative to using two generator sets 140, 142 within a container, it is contemplated that the more than two generator sets 140, 142 could be utilized. Further, while the arrangement focuses on a standard, ISO container application, the inventive principles/aspects described herein may be applied in connection with the container types.

FIG. 2 is a schematic diagram of an air director 114. The air director 114 includes a diagonal portion 202 and a vertical portion 204. In certain embodiments, the vertical portion 204 includes a part of a fuel tank 204. The fuel tank 204 may be included as a part of the air director 114 as shown, or the fuel tank 204 may comprise the entire air director 114. In certain embodiments, the fuel tank 204 is equipped with a fueling access point 206 that can be configured to be accessible from outside the shipping container 102. The exhaust streams 116, 118 may be directed at the air director 114 which turns the exhaust streams 116, 118 from a horizontal or partially horizontal stream orientation to or nearly vertical stream orientation.

Figure 3:
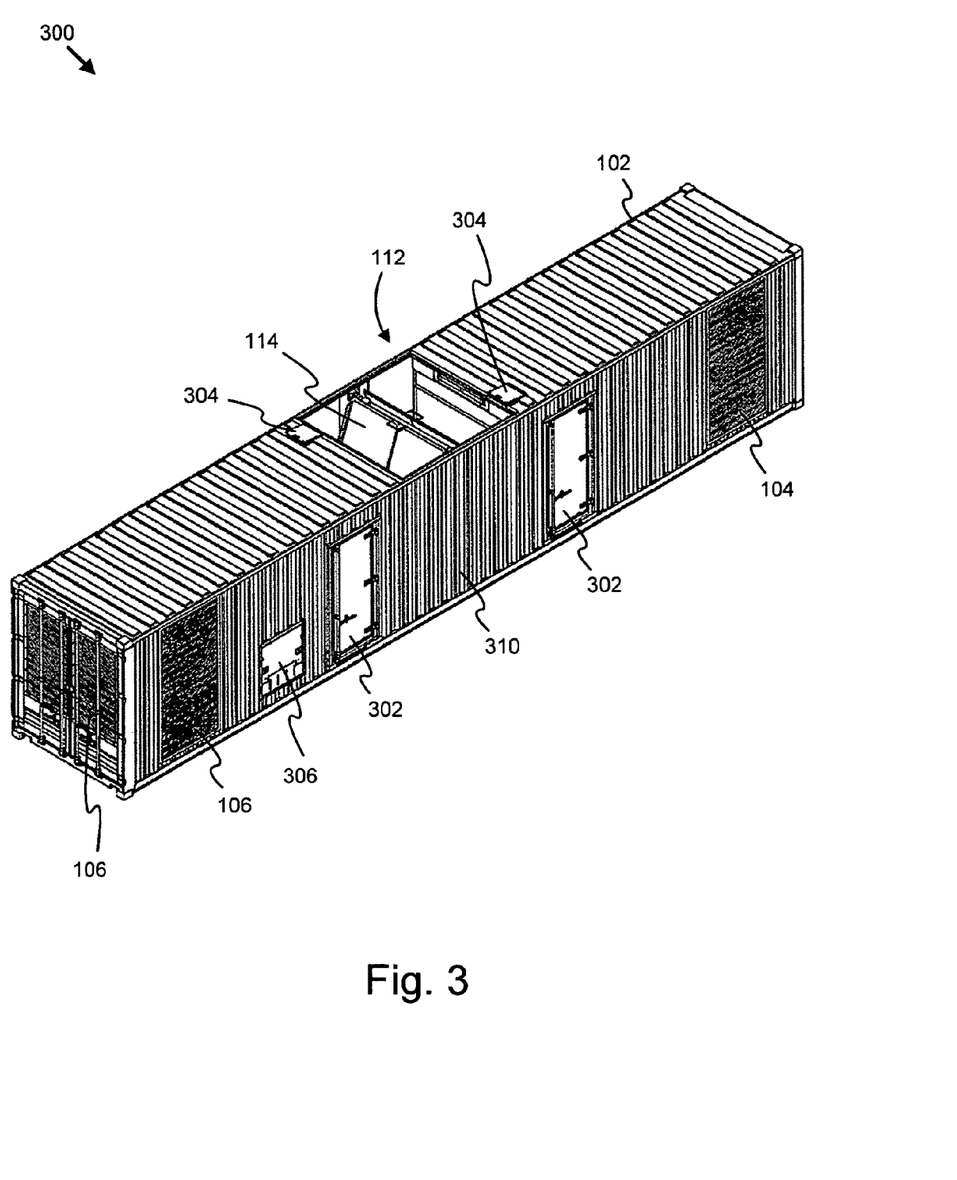
FIG. 3 is a perspective view of a container carrying a pair of generator sets.
Figure 4:
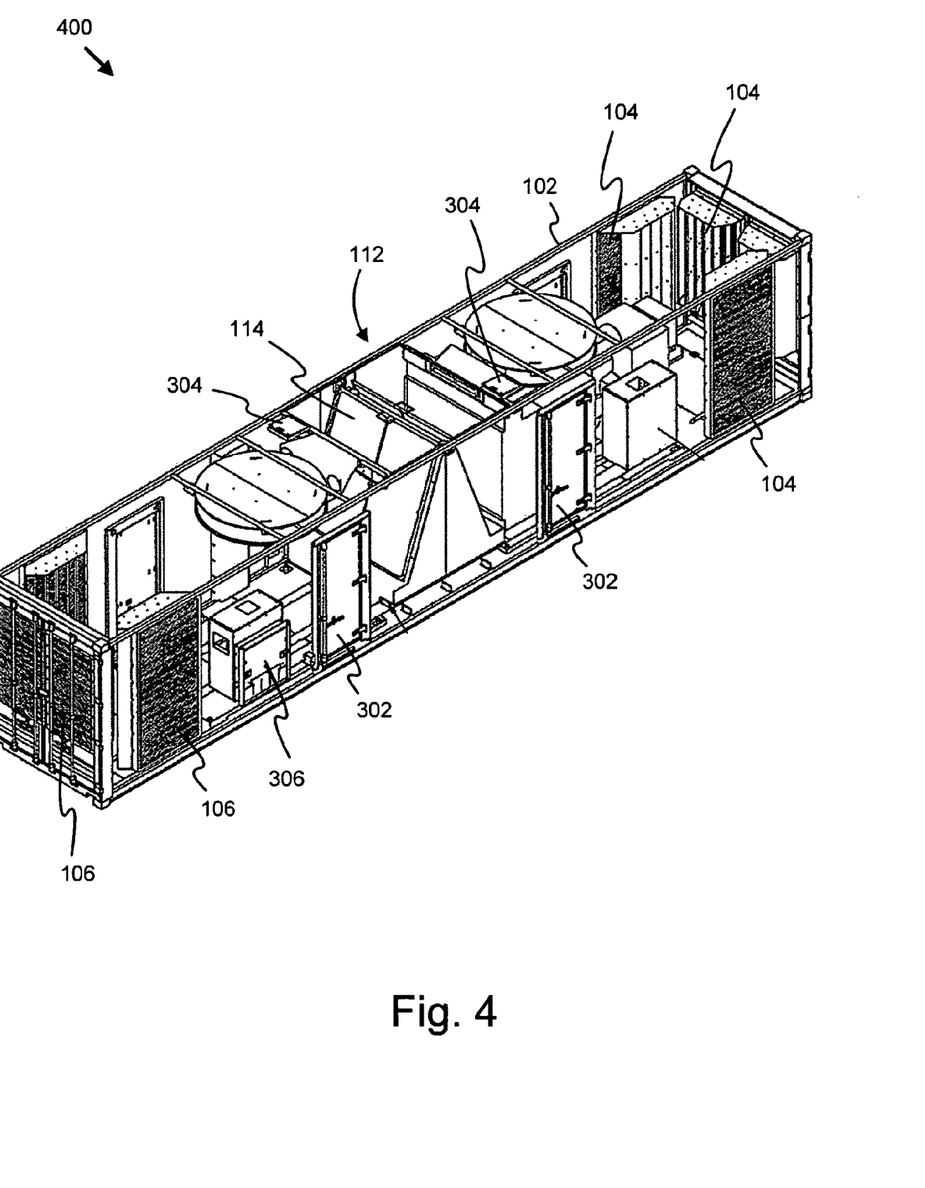
FIG. 4 is a partially diagrammatic, cutaway perspective view of a container carrying a pair of generator sets.

FIG. 3 is a perspective view of a container 102 carrying a pair of generator sets 140, 142. The view of FIG. 3 shows the air inlets 104, 106, and illustrates an example pair of access doors 302 that can be used for maintenance and service for the engines 126, 130 and generators 124, 128. It should be appreciated that the air inlets 104, 106 depicted in FIG. 3 are partially disposed on the sidewalls 310 of the shipping container 102. In some embodiments, the air inlets 104, 106 may be completely disposed at the ends 108, 110 of the shipping container 102, for example as depicted in FIG. 1. The view of FIG. 3 further shows a breaker box access 306. In certain embodiments, a breaker box access 306 may be included on each side of the shipping container 102, and in certain embodiments, all electrical cables may be run to one end of the shipping container 102 for access through a single breaker box access 306. In certain embodiments, radiator fluid access points 304 are provided that allow checking and refilling of radiator 132, 134 levels without opening the shipping container 102. Referencing FIG. 4, the view of FIG. 3 is shown with sidewalls 310 and the top of the shipping container 102 cutaway.

Figure 5:
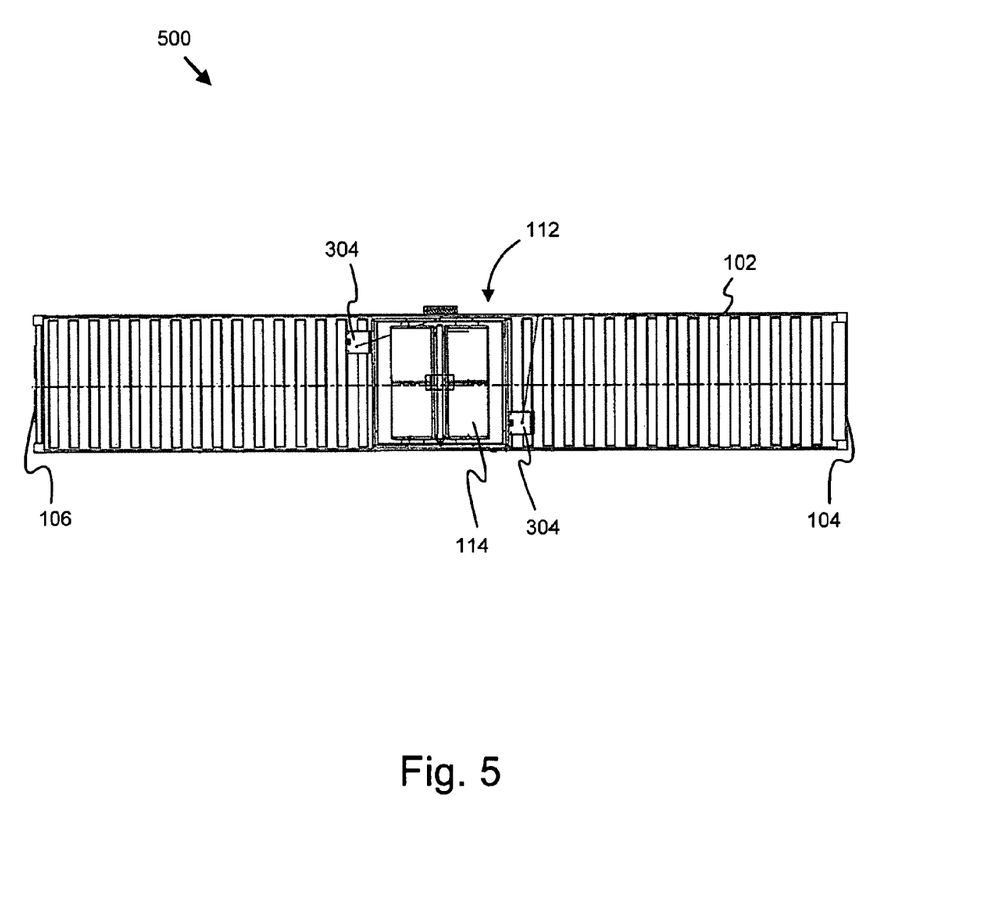
FIG. 5 is a top view of a container carrying a pair of generator sets.
Figure 6:
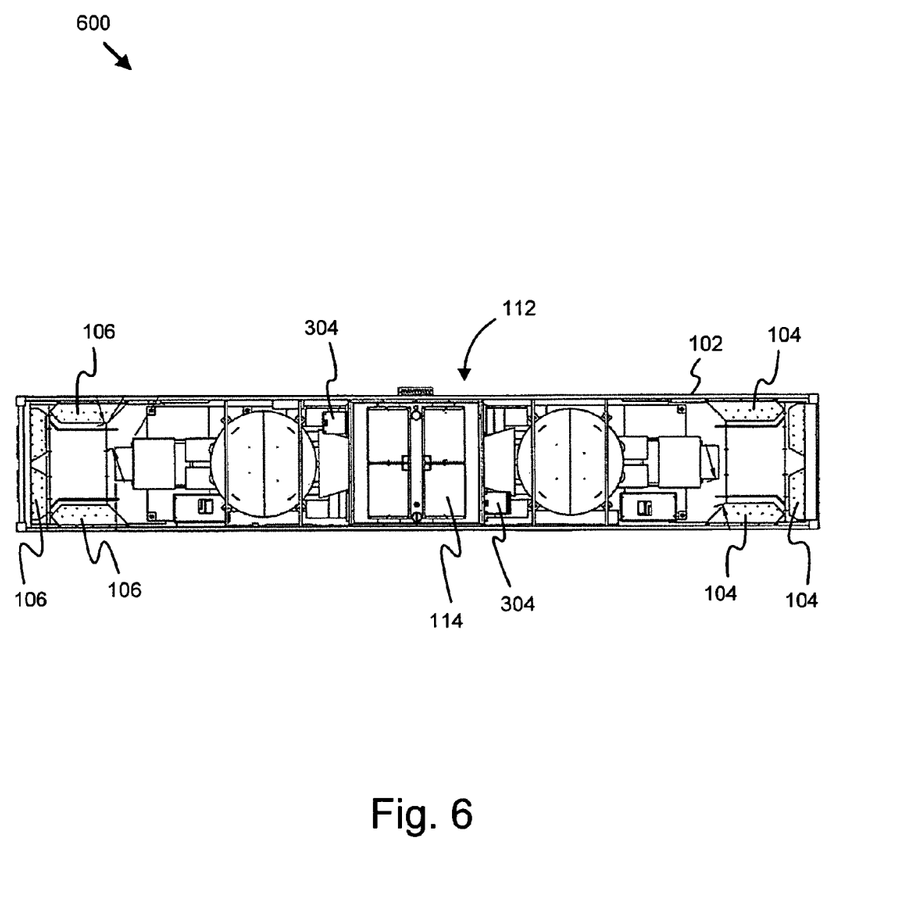
FIG. 6 is a partially diagrammatic, top cutaway view of a container carrying a pair of generator sets.
Figure 7:
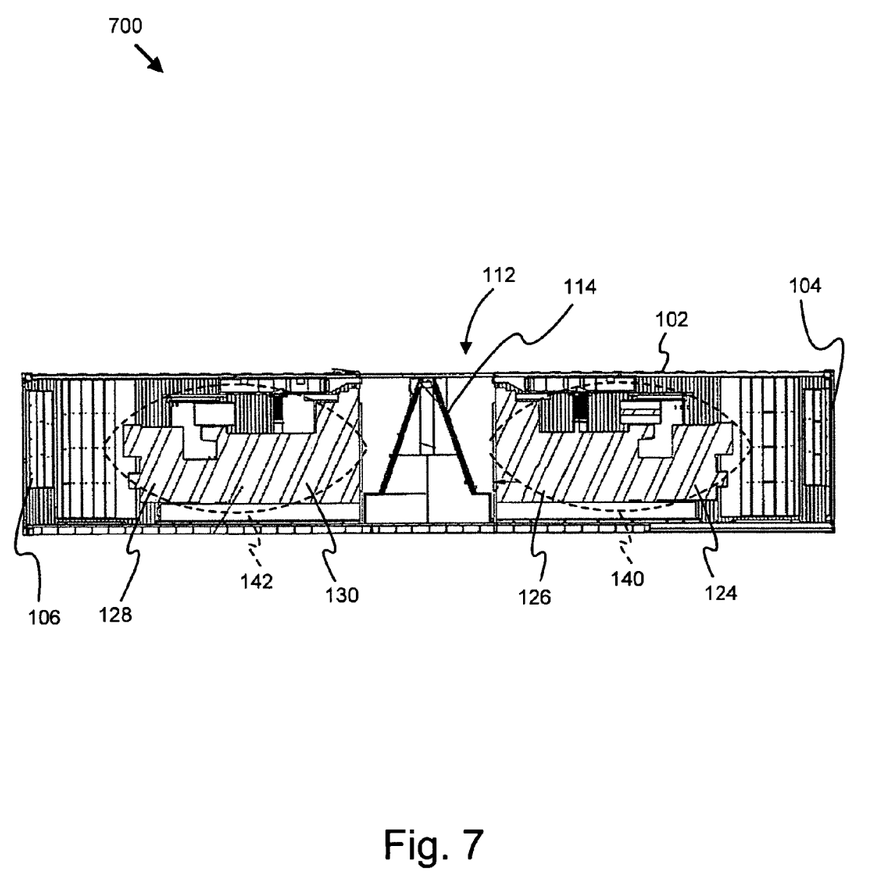
FIG. 7 is a partially diagrammatic, cross-sectional view of a container carrying a pair of generator sets, consistent with a cutaway taken along line A-A of FIG. 5.

FIG. 5 is a top view of the container 102 carrying a pair of generator sets 140, 142. FIG. 6 is a top cutaway view of the container 102 carrying a pair of generator sets 140, 142. The shipping container 102 in FIG. 5 includes the air inlets 104, 106, the air outlet 112, the air director 114, and radiator fluid access points 304. The illustration of FIG. 5 shows a cross-section reference line A-A. Referencing FIG. 7, a cross-sectional view of the container 102 carrying a pair of generator sets 140, 142, consistent with a cutaway taken along line A-A of FIG. 5. FIG. 7 illustrates an embodiment having the first engine 126 and generator 124, the second engine 130 and generator 128, the air inlets 104, 106, the air divider 114, and the air outlet 112.

Figure 8:
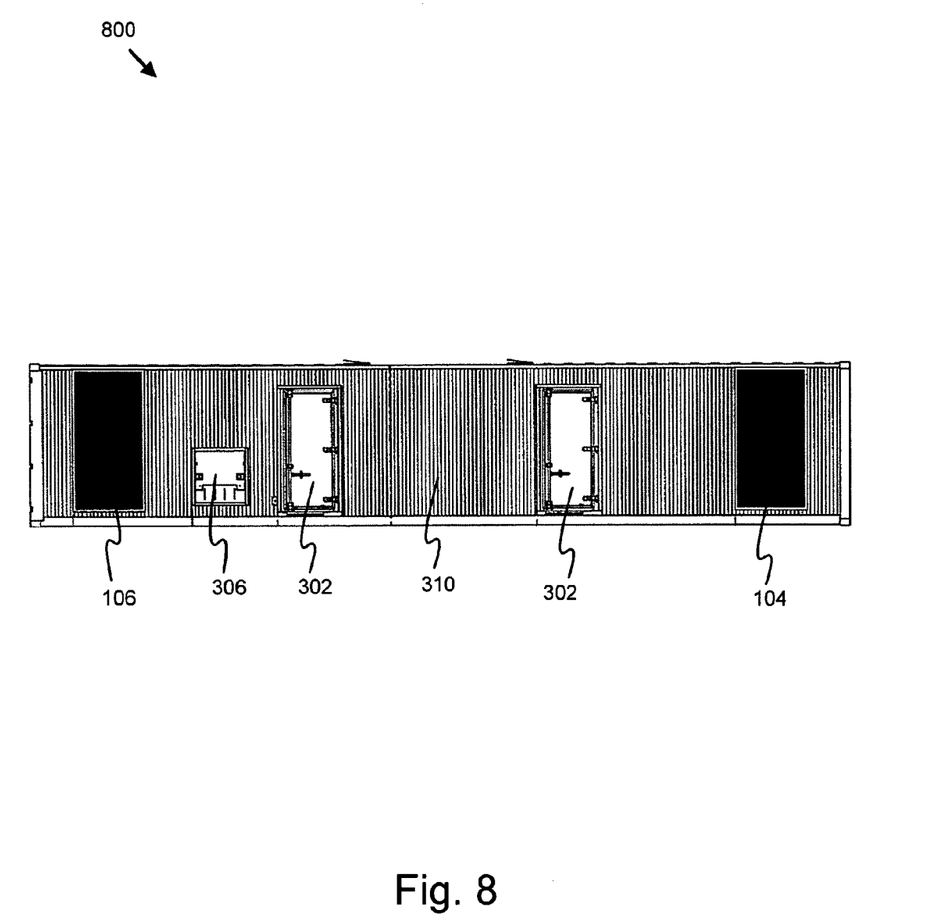
FIG. 8 is a side view of a container carrying a pair of generator sets.
Figure 9:
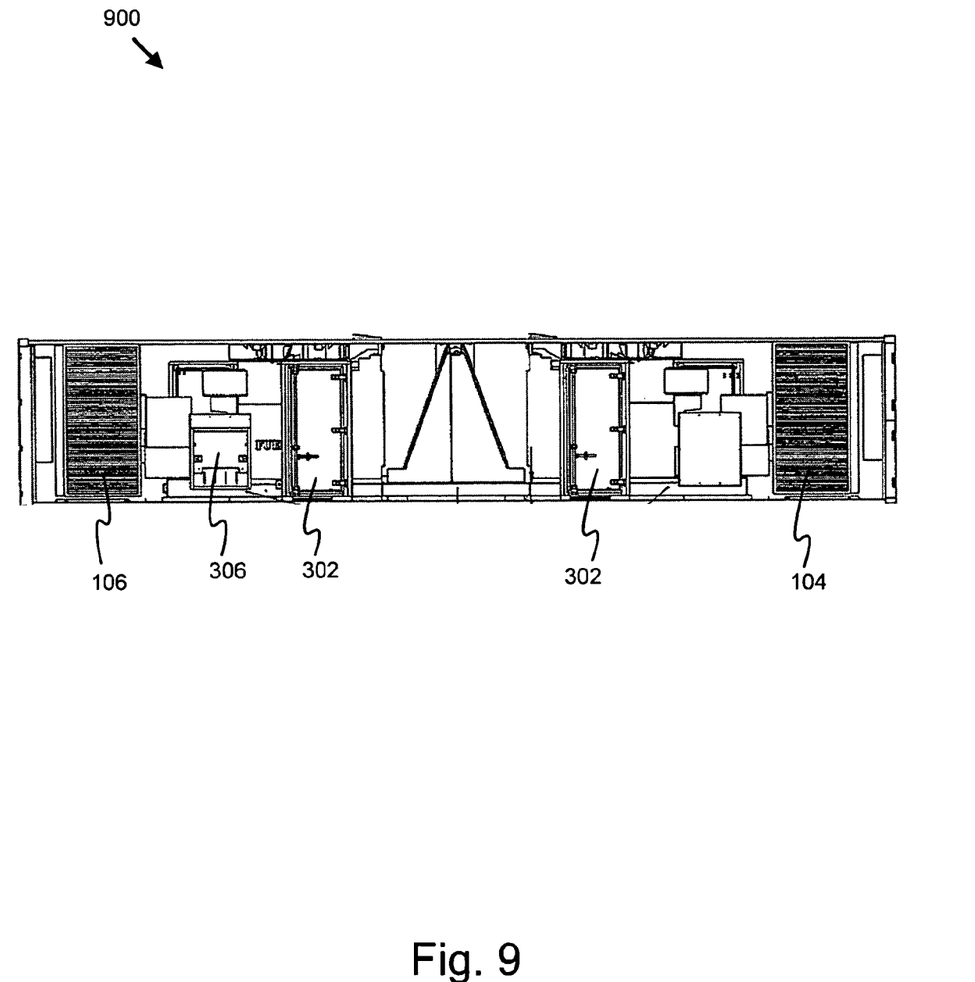
FIG. 9 is a side view of a container carrying a pair of generator sets, with a portion of the sidewall not shown.

FIG. 8 is a side view of the container 102 carrying a pair of generator sets 140, 142. The illustration of FIG. 8 includes the breaker box access 306, and the access doors 302. FIG. 9 is a side view of the container 102 carrying a pair of generator sets 140, 142 (ref no.?) consistent with the illustration of FIG. 8, with a portion of the sidewall 310 not shown.

Figure 10:
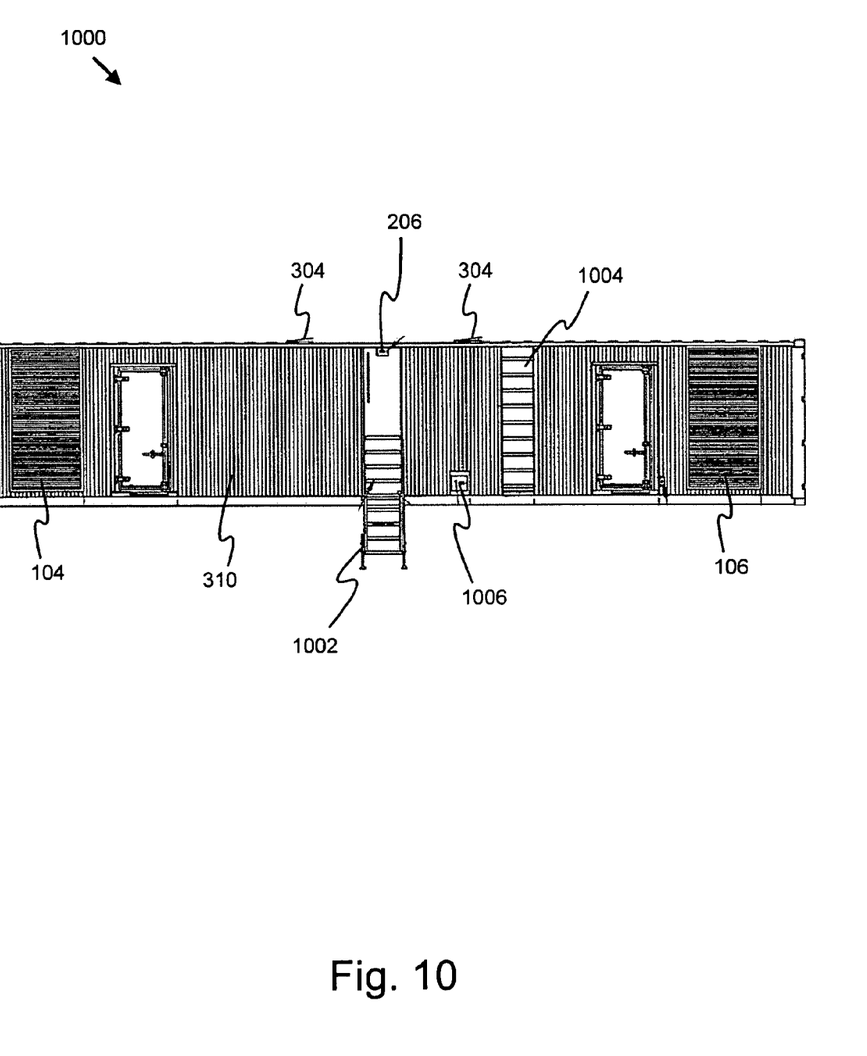
FIG. 10 is a side view of a container carrying a pair of generator sets, and is consistent with an opposite side view from the side view illustrated in FIG. 9.
Figure 11:
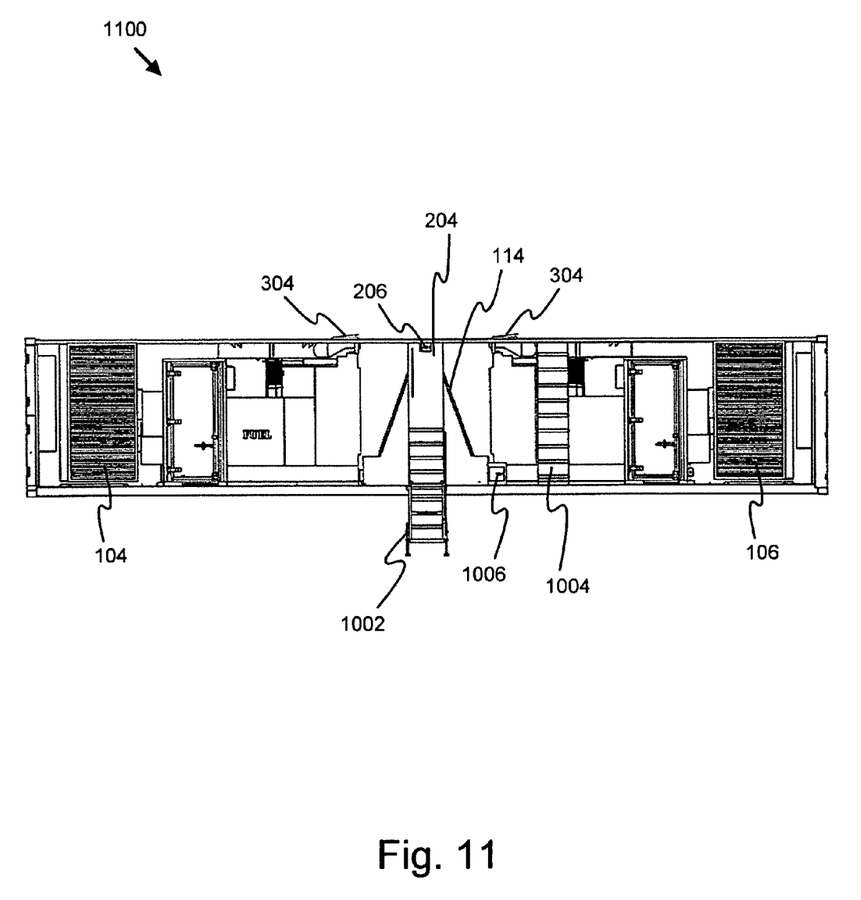
FIG. 11 is a partially diagrammatic, side view of a container carrying a pair of generator sets, and is consistent with the side view of FIG. 10 with a portion of the sidewall not shown.

FIG. 10 is a side view of the container 102 carrying a pair of generator sets 140, 142 (ref no.?), and is consistent with an opposite side view from the side view illustrated in FIG. 9. FIG. 10 illustrates the fueling access point 206, and a fuel fill ladder 1002 allowing access to the fueling access point 206. The embodiment illustrated in FIG. 10 further includes a roof access ladder 1004. Referencing FIG. 11, a side view of the container 102 carrying a pair of generator sets 140, 142 is shown, and the illustration of FIG. 11 is consistent with the side view of FIG. 10 with a portion of the sidewall 310 not shown.

The schematic flow diagram and related description which follows provides an illustrative embodiment of performing procedures for operating generator sets. Operations illustrated are understood to be exemplary only, and operations may be combined or divided, and added or removed, as well as re-ordered in whole or part, unless stated explicitly to the contrary herein.

Figure 12:
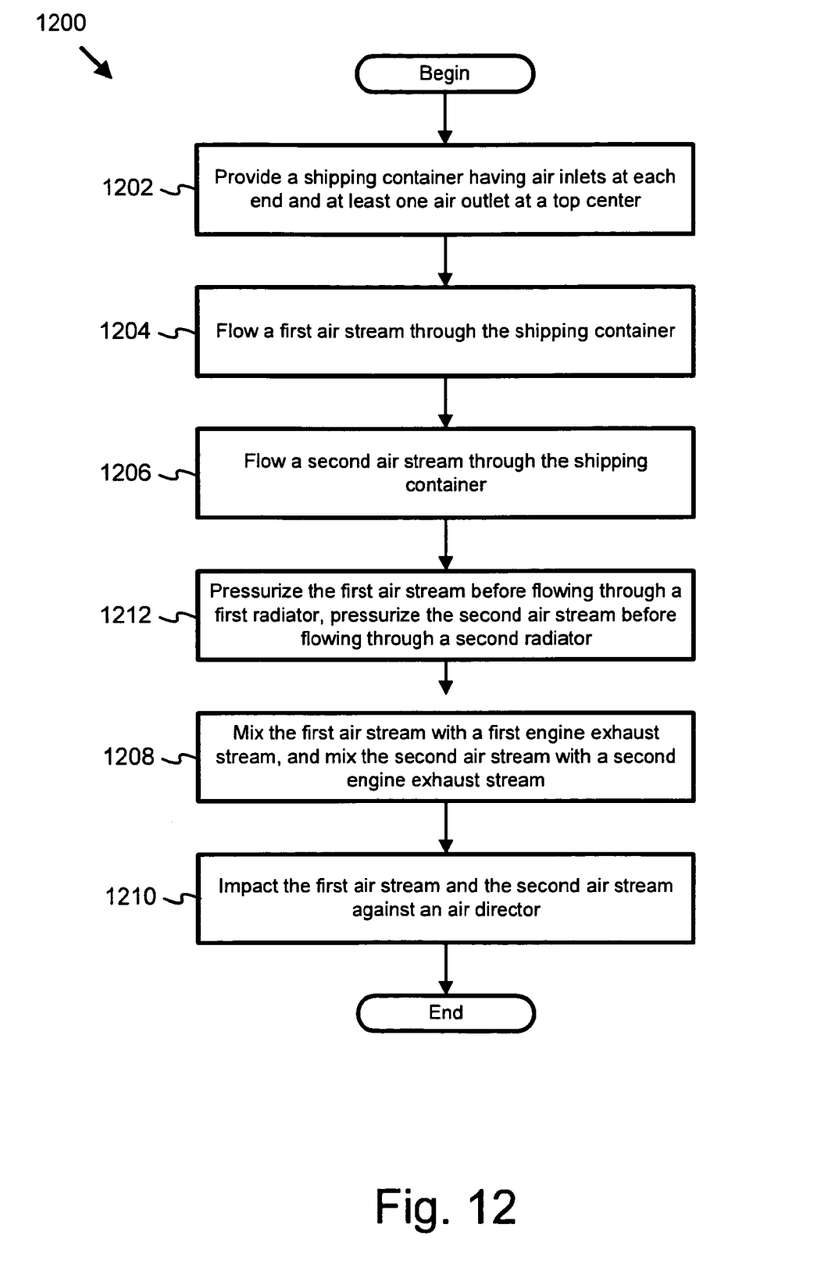
FIG. 12 is a schematic flow diagram of a procedure for operating a pair of generator sets installed in a single shipping container.

FIG. 12 is a schematic flow diagram of a procedure 1200 for operating a pair of generator sets installed in a single shipping container, including, but not limited to, those described in connection with FIGS. 1-11. The procedure 1200 includes an operation 1202 to provide a shipping container having air inlets at each end and at least one air outlet at a top center of the shipping container, and an operation 1204 to flow a first air stream through the shipping container. The operation 1204 includes, in order: contacting the first air stream with a first generator and flowing the first air stream through a first radiator thermally coupled to a first engine. The procedure 1200 includes an operation 1206 to flow a second air stream through the shipping container. The operation 1206 includes, in order: contacting the second air stream with a second generator and flowing the second air stream through a second radiator thermally coupled to a second engine.

The procedure 1200 includes an operation 1208 of mixing the first air stream with a first engine exhaust stream and mixing the second air stream with a second engine exhaust stream. The procedure 1210 further includes impacting the first air stream and the second air stream against an air director, and flowing the first air stream and the second air stream vertically through the air outlet(s). The procedure 1200 includes an operation 1212 to pressurize the first air stream before flowing the first air stream through the first radiator and to pressurize the second air stream before flowing the second air stream through the second radiator.

In certain embodiments, the operation 1202 of providing the shipping container further includes providing a shipping container having air inlets at each end, and the air inlets vertically lower than the air outlet(s). In certain embodiments, the operation 1202 of providing the shipping container further includes providing the air inlets at each end and configuring the air inlets and the air outlet(s) such that the smallest distance between a closest air inlet and air outlet is maximized. In certain embodiments, the operation 1202 of providing the shipping container further includes providing the air inlets at each end and configuring the air inlets and the air outlet(s) such that the distance between a closest air inlet and the air outlet(s) is approximately equal. Approximately equal in the present context indicates that within the design constraints of the system, a distance between a closest air inlet and the air outlet(s) is about the same for each closest air inlet to an air outlet path. In certain embodiments, approximately equal comprises distances that differ within about a width of the shipping container or less. In certain embodiments, the distances are not approximately equal. In certain embodiments, the distance between an air outlet and an air inlet is measured geometrically (e.g. along a surface tracing of the shipping container), but may be measured through any other means including at least a likely air flow path.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

Many different embodiments of the present invention are envisioned.

One exemplary embodiment is a system including a shipping container having air inlets at a first end, air inlets at a second end, and at least one air outlet at a top of the shipping container. The system further includes a first engine positioned between a center of the shipping container and the first end, a second engine positioned between the center of the shipping container and the second end, a first generator positioned between the first engine and the first end, and a second generator positioned between the second engine and the second end. The system further includes an air director structured to contribute a vertical component to each of a first exhaust stream and a second exhaust stream, and further structured to direct the first exhaust stream and the second exhaust stream through the at least one air outlet.

In certain embodiments, the air outlet is positioned at a center of the shipping container. In certain embodiments, the system includes a first air path including a portion in thermal communication with the first generator, and a portion in thermal communication with a first engine radiator. The first exhaust stream flows in the first air path. In certain embodiments, the system includes a second air path including a portion in thermal communication with the second generator, and a portion in thermal communication with a second engine radiator. The second exhaust stream flows in the second air path. In certain embodiments, the first air path further includes a portion receiving at least a portion of a first engine exhaust and the second air path further includes a portion receiving at least a portion of a second engine exhaust.

Alternatively or additionally, in still other embodiments, the system includes a first air movement device that forces air through the first radiator and a second air movement device that forces air through the second radiator. The system further includes, in certain embodiments, the air director including a fuel tank. In certain embodiments, the air director includes a diagonal portion and a vertical portion, and in certain further embodiments the vertical portion includes a portion of the fuel tank. In certain embodiments, the shipping container is an International Organization for Standardization (ISO) standard shipping container.

One further exemplary embodiment is a system including a standard International Organization for Standardization (ISO) shipping container having air inlets at a first end, air inlets at a second end, and an air outlet at a center top of the shipping container. In certain embodiments, the system includes a first engine, having a rating below 1200 horsepower (hp), positioned between a center of the shipping container and the first end, and a second engine, having a rating below 1200 hp, positioned between the center of the shipping container and the second end. In certain further embodiments, a first generator is positioned between the first engine and the first end, and a second generator is positioned between the second engine and the second end. In certain embodiments, an air director contributes a vertical component to each of a first exhaust stream and a second exhaust stream, and the air director directs the first exhaust stream and the second exhaust stream through the air outlet.

In yet other embodiments, at least one of the air inlets is at least partially positioned on a side wall of the standard ISO shipping container. In certain embodiments, the system includes a first air path having a portion in thermal communication with the first generator, and a portion in thermal communication with a first engine radiator, where the first exhaust stream flows in the first air path. In certain embodiments, the system includes a second air path having a portion in thermal communication with the second generator, and a portion in thermal communication with a second engine radiator, where the second exhaust stream flows in the second air path. In certain embodiments, the first air path further includes a portion receiving at least a portion of a first engine exhaust and the second air path further includes a portion receiving at least a portion of a second engine exhaust. In certain embodiments, the system further includes an air movement device that forces air through the first radiator and a second air movement device that forces air through the second radiator.

One other exemplary embodiment is a method including providing a shipping container having air inlets at each end and at least one air outlet at a top center of the shipping container. The method further includes flowing a first air stream through the shipping container, where the flowing the first air stream includes, in order: contacting the first air stream with a first generator, flowing the first air stream through a first radiator thermally coupled to a first engine, impacting the first air stream against an air director, and flowing the first air stream vertically through the at least one air outlet. The method further includes flowing a second air stream through the shipping container, where the flowing the second air stream includes, in order: contacting the second air stream with a second generator, flowing the second air stream through a second radiator thermally coupled to a second engine, impacting the second air stream against an air director, and flowing the second air stream vertically through the at least one air outlet.

In further embodiments, the method further includes mixing the first air stream with a first engine exhaust stream before the flowing the first air stream vertically, and mixing the second air stream with a second engine exhaust stream before the flowing the second air stream vertically. In certain embodiments, the method further includes pressurizing the first air stream before flowing the first air stream through the first radiator and pressurizing the second air stream before flowing the second air stream through the second radiator. In certain embodiments of the method, providing a shipping container having air inlets at each end and at least one air outlet at a top center of the shipping container includes providing the air inlets vertically lower than the air outlet(s). In certain embodiments, providing a shipping container having air inlets at each end and at least one air outlet at a top center of the shipping container includes providing the air inlets and the air outlet(s) such that a smallest distance between the air outlet(s) and a closest one of the air inlets is maximized. In certain embodiments, providing a shipping container having air inlets at each end and at least one air outlet at a top center of the shipping container includes providing the air inlets and the air outlet(s) such that a distance between the air outlet(s) and a closest one of the air inlets is approximately equal.

In yet another example, a system comprises a shipping container defining at least a first compartment and a second compartment; a first generator set positioned within the first compartment and extending between a front end and a rear end, the first generator set including a first engine and a first generator; a second generator set positioned within the second compartment and extending between a front end and a rear end, the second generator set including a second engine and a second generator; wherein the first generator set and the second generator set are positioned within the respective first and second compartments such that the front end of the first generator set faces towards the front end of the second generator set. In one form of this system, the shipping container is of an ISO type and includes a third compartment positioned between the first and second generator sets. Alternatively or additionally, the system further comprises a fuel tank positioned within the third compartment, the front end of each of the first generator set and the second generator set is the end of the generator set nearest the end of an engine crank shaft that is not driving the generator, and/or the system further comprises a plurality of air ducts coupled to each of a first end and a second end of the ISO shipping container.

What is claimed is:

1. A system, comprising:
   a shipping container having air inlets at a first end, air inlets at a second end, and at least one air outlet at a top of the shipping container;
   a first engine positioned between a center of the shipping container and the first end, and a second engine positioned between the center of the shipping container and the second end;
   a first generator positioned between the first engine and the first end, and a second generator positioned between the second engine and the second end;
   a first air path comprising a first portion in thermal communication with the first generator and a second portion for receiving at least a portion of a combustion exhaust gas from the first engine to provide a first mixed exhaust stream;
   a second air path comprising a first portion in thermal communication with the second generator and a second portion for receiving at least a portion of a combustion exhaust gas from the second engine to provide a second mixed exhaust stream; and
   an air director structured to contribute a vertical component to each of the first mixed exhaust stream and the second mixed exhaust stream, and further structured to direct the first mixed exhaust stream and the second mixed exhaust stream through the at least one air outlet.

2. The system of claim 1, wherein the first portion of the first air path is in thermal communication with a first engine radiator and the first portion of the second air path is in thermal communication with a second engine radiator.

3. The system of claim 2, further comprising a first air movement device that forces air through the first radiator and a second air movement device that forces air through the second radiator.

4. The system of claim 1, wherein the air director includes a vertical portion.

5. The system of claim 1, further comprising:
   a first heat transfer means that transfers thermal energy from the first generator to the first air path; and
   a second heat transfer means that transfers thermal energy from the second generator to the second air path.

6. The system of claim 1, wherein the air director comprises a fuel tank.

7. The system of claim 1, wherein the air director comprises a first surface extending obliquely to a second surface, the second surface extending upwardly from the first surface and orthogonally to the first air path and the second air path.

8. The system of claim 1, wherein the shipping container is an International Organization for Standardization (ISO) standard shipping container.

9. A method, comprising:
   providing a shipping container having air inlets at each end and at least one air outlet at a top and approximate center of the shipping container;
   flowing a first air stream through the shipping container, wherein flowing the first air stream includes, in order: contacting the first air stream with a first generator, flowing the first air stream through a first radiator thermally coupled to a first engine, mixing the first air stream with a first engine exhaust stream, impacting the first air stream against an air director, and flowing the first air stream vertically through the at least one air outlet; and
   flowing a second air stream through the shipping container, wherein flowing the second air stream includes, in order: contacting the second air stream with a second generator, flowing the second air stream through a second radiator thermally coupled to a second engine, mixing the second air stream with a second engine exhaust stream, impacting the second air stream against an air director, and flowing the second air stream vertically through the at least one air outlet.

10. The method of claim 9, further comprising pressurizing the first air stream before flowing the first air stream through the first radiator and pressurizing the second air stream before flowing the second air stream through the second radiator.

11. The method of claim 9, wherein the providing a shipping container having air inlets at each end and at least one air outlet at a top and approximate center of the shipping container includes providing the air inlets vertically lower than the at least one air outlet.

12. The method of claim 9, wherein the providing a shipping container having air inlets at each end and at least one air outlet at a top and approximate center of the shipping container includes providing the air inlets and the at least one air outlet such that a smallest distance between the at least one air outlet and a closest one of the air inlets is maximized.

13. The method of claim 9, wherein the providing a shipping container having air inlets at each end and at least one air outlet at a top and approximate center of the shipping container includes providing the air inlets and the at least one air outlet such that a distance between the at least one air outlet and a closest one of the air inlets is approximately equal.

14. A system, comprising:
   a standard International Organization for Standardization (ISO) shipping container having air inlets at a first end, air inlets at a second end, and an air outlet at a top and approximate center of the shipping container;

a first engine, having a rating below 1200 horsepower (hp), positioned between a center of the shipping container and the first end, and a second engine, having a rating below 1200 hp, positioned between the center of the shipping container and the second end;

a first generator positioned between the first engine and the first end, and a second generator positioned between the second engine and the second end; and an air director structured to contribute a vertical component to each of a first exhaust stream including combustion exhaust from the first engine and a second exhaust stream including combustion exhaust from the second engine, and further structured to direct the first exhaust stream and the second exhaust stream through the air outlet.

15. The system of claim 14, wherein the at least one of the air inlets includes at least a portion on a side wall of the standard ISO shipping container.

16. The system of claim 14, further comprising:
a first air path comprising a portion in thermal communication with the first generator, and a portion in thermal communication with a first engine radiator, wherein the first exhaust stream flows in the first air path; and
a second air path comprising a portion in thermal communication with the second generator, and a portion in thermal communication with a second engine radiator, wherein the second exhaust stream flows in the second air path.

17. The system of claim 16, further comprising a first air movement device that forces air through the first radiator and a second air movement device that forces air through the second radiator.

18. The system of claim 16, further comprising:
a first heat transfer means that transfers thermal energy from the first generator to the first air path; and
a second heat transfer means that transfers thermal energy from the second generator to the second air path.

* * * * *